US008695544B2

(12) United States Patent
Sawada et al.

(10) Patent No.: US 8,695,544 B2
(45) Date of Patent: Apr. 15, 2014

(54) HIGH EXPANSION RATIO INTERNAL COMBUSTION ENGINE

(75) Inventors: Daisaku Sawada, Gotenba (JP); Eiichi Kamiyama, Mishima (JP); Takashi Kawasaki, Susono (JP); Yukihiro Nakasaka, Suntou-Gun (JP); Daisuke Akihisa, Susono (JP); Naoto Hisaminato, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 12/678,602

(22) PCT Filed: Jan. 29, 2009

(86) PCT No.: PCT/JP2009/051492
§ 371 (c)(1),
(2), (4) Date: Mar. 17, 2010

(87) PCT Pub. No.: WO2010/086987
PCT Pub. Date: Aug. 5, 2010

(65) Prior Publication Data
US 2012/0017876 A1 Jan. 26, 2012

(51) Int. Cl.
*F01L 1/34* (2006.01)
*F02B 75/04* (2006.01)
*F01L 1/46* (2006.01)

(52) U.S. Cl.
USPC .................. 123/90.15; 123/90.16; 123/90.17

(58) Field of Classification Search
USPC .......... 123/90.15, 90.16, 90.17; 701/101, 102
See application file for complete search history.

(56) References Cited

U.S. PATENT DOCUMENTS 4,174,683 A * 11/1979 Vivian ........................ 123/48 C
4,582,029 A * 4/1986 Masuda et al. ............ 123/90.16
4,805,571 A * 2/1989 Humphrey .................... 123/316
5,233,948 A * 8/1993 Boggs et al. .................... 123/64
6,615,775 B2 * 9/2003 Takemura et al. ......... 123/90.15
6,647,935 B2 * 11/2003 Aoyama et al. ............ 123/90.16
6,772,742 B2 * 8/2004 Lei et al. ................. 123/568.14

(Continued)

FOREIGN PATENT DOCUMENTS

EP 262769 A * 4/1988 .............. F02B 29/08
JP A-3-31518 2/1991

(Continued)

OTHER PUBLICATIONS

International Search Report issued in International Patent Application No. PCT/JP2009/051492, on Mar. 3, 2009, (with English Translation).

*Primary Examiner* — Noah Kamen
*Assistant Examiner* — Grant Moubry
(74) *Attorney, Agent, or Firm* — Oliff PLC

(57) ABSTRACT

A high expansion ratio internal combustion engine includes: a variable compression ratio mechanism that varies a mechanical compression ratio of the internal combustion engine; and a variable valve train in which some valve(s) of a plurality of intake valves is phase-variable and the remaining valve(s) is phase-fixed, the variable valve train being configured such that a working angle of the phase-variable intake valve is larger than a working angle of the phase-fixed intake valve, wherein a valve-open timing of the phase-variable intake valve is retarded after a valve-open timing of the phase-fixed intake valve when the internal combustion engine is under low-load operating state.

10 Claims, 15 Drawing Sheets crank position sensor
accelerator position sensor
ECU lift amount
first intake valve
second intake valve
CA

(56) References Cited

U.S. PATENT DOCUMENTS 6,792,924 B2 * 9/2004 Aoyama et al. .......... 123/568.14
6,886,533 B2 * 5/2005 Leiby et al. .................. 123/432
7,240,664 B2 * 7/2007 Yoshida et al. ............... 123/346
7,252,054 B2 * 8/2007 Weber et al. ............... 123/90.15
7,278,383 B2 * 10/2007 Kamiyama et al. ......... 123/48 C
7,334,547 B2 * 2/2008 Hiraya et al. ............... 123/48 R
7,357,119 B2 * 4/2008 Yoshida et al. ............... 123/346
7,669,559 B2 * 3/2010 Aoyama et al. ............. 123/48 B
7,706,955 B2 * 4/2010 Ichimoto et al. .............. 701/102
7,765,968 B2 * 8/2010 Mashiki et al. ............ 123/90.17
2005/0183693 A1 * 8/2005 Yang et al. .................... 123/305
2006/0144356 A1 * 7/2006 Sellnau et al. ............. 123/90.16
2006/0225678 A1 * 10/2006 Murata ...................... 123/90.15
2008/0078345 A1 * 4/2008 Knauf et al. ............... 123/90.17
2008/0092834 A1 * 4/2008 Stein et al. ................. 123/90.15
2009/0187329 A1 7/2009 Akihisa et al.

FOREIGN PATENT DOCUMENTS

JP A-3-88907 4/1991
JP A-2007-303423 11/2007
JP A-2008-175127 7/2008

* cited by examiner

HIGH EXPANSION RATIO INTERNAL COMBUSTION ENGINE

TECHNICAL FIELD

The present invention relates to an internal combustion engine that is operable with high expansion ratio.

BACKGROUND ART

A valve drive system is known in which, among a plurality of intake valves arranged at each cylinder, some valve(s) is of variable phase and the remaining valve(s) is of fixed phase (see Patent Document 1, for example).

In addition, a high expansion ratio internal combustion engine is known which includes: a variable compression ratio mechanism that varies a ratio between an internal volume of a cylinder at the time a piston is located at a top dead center (a combustion chamber volume) and an internal volume of the cylinder at the time the piston is located at a bottom dead center (a mechanical compression ratio); and a variable valve train that varies a ratio between the combustion chamber volume and an internal volume of the cylinder at the time an intake valve is closed (an effective compression ratio), wherein the expansion ratio to increased to a maximum extent by decreasing the effective compression ratio while increasing the mechanical compression ratio when the internal combustion engine is under relatively low-load (see Patent Document 2, for example).

Patent Document 1: Japanese Unexamined Patent Publication No. H03-088907

Patent Document 2: Japanese Unexamined Patent Publication No. 2007-303423

DISCLOSURE OF THE INVENTION

Problem to be Solved by the Invention

An object of the present invention is to realize a high expansion ratio internal combustion engine by employing a variable valve train in which, among a plurality of intake valves provided to each cylinder, some valve(s) is of variable phase and the remaining valve(s) is of fixed phase.

Means for Solving the Problem

In order to solve the aforementioned problems, the present invention has adopted the following means.

That is, a high expansion ratio internal combustion engine of the present invention includes:

a variable compression ratio mechanism that varies a mechanical compression ratio of the internal combustion engine;

a variable valve train in which some valve(s) of a plurality of intake valves is phase-variable and the remaining valve(s) is phase-fixed; and a control means for controlling the variable valve train such that actuation of the phase-variable intake valve lags behind actuation of the phase-fixed intake valve, when the internal combustion engine is under low-load operating state.

When the high expansion ratio internal combustion engine is under low-load operating state, the expansion ratio is increased so as to enhance thermal efficiency. An example way to increase the expansion ratio is to increase the mechanical compression ratio of the internal combustion engine.

However, if the mechanical compression ratio and the effective compression ratio are approximately equivalent, there is a danger that knocking will be inevitable even if the internal combustion engine is under low-load operating state. It is therefore necessary to employ the variable valve train so as to cause a valve-close timing of the intake valve to retard, thereby decreasing the effective compression ratio while maintaining the expansion ratio at high level.

Recently, there is a demand for reduction in size and weight of internal combustion engine. In order to meet such a demand, a high expansion ratio internal combustion engine according to the present invention includes a variable valve train in which only some valve(s) of a plurality of intake valves provided to a cylinder is of variable phase, and actuation of the phase-variable intake valve (hereinafter referred to as "phase-variable valve") is lagged behind actuation of a phase-fixed intake valve (hereinafter referred to as "phase-fixed valve") when the internal combustion engine is under low-load operating state.

According to such a high expansion ratio internal combustion engine, it is also possible to cause a valve-close timing of the phase-variable valve to be retarded after a valve-close timing of the phase-fixed valve, when the internal combustion engine is under low-load operating state.

As a result, it becomes possible to increase the expansion ratio of the internal combustion engine while facilitating reduction in size and weight of the internal combustion engine.

In the present invention, the variable valve train may also be configured such that a working angle of the phase-variable valve is larger than a working angle of the phase-fixed valve.

In the high expansion ratio internal combustion engine, the mechanical compression ratio is sometimes increased to a maximum value so as to increase the expansion ratio in low-load operation to a maximum extent. In such case, the combustion chamber volume becomes extremely small, resulting in interference between intake valve and piston (valve stamp) more likely to occur. In order to avoid such valve stamp, no other choice is left but to set a valve-open timing of the phase-fixed valve to be retarded after that of a typical internal combustion engine. It is therefore necessary to angularly advance the valve-open timing of the phase-variable valve and thereby ensure sufficient air intake quantity, when the internal combustion engine is under high-load operating state.

In doing so, if the working angle of the phase-variable valve and the working angle of the phase-fixed valve are equivalent, the valve-close timing of the phase-variable valve will be advanced than that of the phase-fixed valve. Therefore, it may be difficult to increase the air intake quantity to a targeted level. There is also another possible way that makes the valve-close timing of the phase-variable valve approximately equivalent to the valve-close timing of the phase-fixed valve. However, this can lead to degradation of efficiency of intake air charge due to decrease in amount of valve overlap, or can lead to increase in pumping loss of intake air.

On the other hand, if the working angle of the phase-variable valve is made larger than the working angle of the phase-fixed valve, the valve-close timing of the phase-variable valve can be prevented from being excessively advanced even if the valve-open timing of the phase-variable valve is angularly advanced in high-load operation. As a result, shortage of air intake quantity during high-load operation can be relieved.

Furthermore, according to the present invention, a total flow passage area (a sum of valve-opened flow passage area of the phase-fixed valve and valve-opened flow passage area of the phase-variable valve) can also be enlarged in case where the valve-close timing of the phase-variable valve is retarded substantially for the purpose of decreasing the effective compression ratio. As a result, not only flow loss associated with intake air flowing from an intake port into the cylinder (for example, throttle loss associated with intake air passing through the intake valve) but also flow loss associated with intake air flowing back from within the cylinder to the intake port can be decreased.

In case where the valve-close timing of the phase-variable valve is retarded for the purpose of decreasing the effective compression ratio, however, all of intake air flowing back from within the cylinder to the intake port will flow through the phase-variable valve to the intake port after the phase-fixed valve is closed. Therefore, throttle loss associated with intake air flowing through the phase-variable valve will be increased. Especially in the high expansion ratio internal combustion engine, since the valve-close timing of the phase-variable valve is sometimes retarded until the middle of the compression stroke, the aforementioned increase in throttle loss will be pronounced.

In light of the foregoing, the variable valve train according to the present invention may be configured such that a curtain area of the phase-variable valve is larger than a curtain area of the phase-fixed valve. The term "curtain area" used herein refers to an area of cylindrical portion that connects valve shade portion and valve seat under valve-opened condition.

With the variable valve train thus configured, the aforementioned increase in throttle loss can be decreased. As a result, it becomes possible to decrease the effective compression ratio in an efficient manner.

Another effective way to reduce the increase in throttle loss just before the phase-variable valve is closed is to configure the variable valve train such that a rate of decrease in curtain area (an amount of decrease in curtain area per unit time (per given crank angle)) of the phase-variable valve during valve-closing operation is higher than a rate of decrease in curtain area of the phase-fixed valve during valve-closing operation.

In this way, since the curtain area of the phase-variable valve will be decreased dramatically, the increase in throttle loss just before the phase-variable valve is closed can be reduced.

There are other ways to increase the rate of decrease in curtain area of the phase-variable valve during valve-closing operation, such as to make a lift amount of the phase-variable valve (a maximum lift amount) larger than a lift amount of the phase-fixed valve, to make a speed of valve-closing operation of the phase-variable valve higher than a speed of valve-closing operation of the phase-fixed valve (for example, creating a cam profile such that a lift waveform of the phase-variable valve makes a convex curve), or the like. In this way, it becomes possible to reduce the increase in throttle loss just before the phase-variable valve is closed as well as to facilitate the increase in total flow passage area described above.

Secondly, the working angle of the phase-variable valve according to the present invention may be set such that, in case where the valve-open timing of the phase-variable valve is angularly advanced to a targeted valve-open timing of high-load operation, the valve-close timing of the phase-variable valve will be after the valve-close timing of the phase-fixed valve. With such a configuration, it becomes easier to eliminate the shortage of air intake quantity during high-load operation.

In the above-mentioned configuration, the control means may also adjust the valve-close timing of the phase-variable valve in high-load operation according to a revolution speed of the internal combustion engine (a number of engine revolutions). For example, the control means may control the variable valve train such that the valve-close timing of the phase-variable valve is synchronized with the valve-close timing of the phase-fixed valve if the number of engine revolutions is less than or equal to a predetermined number of revolutions, and may also control the variable phase drive mechanism such that the valve-close timing of the phase-variable valve is retarded after the valve-close timing of the phase-fixed valve if the number of engine revolutions is greater than the predetermined number of revolutions.

This is because when the number of engine revolutions is high, the more the valve-close timing of the phase-variable valve is retarded, the more inertial effect of intake air can be obtained. Note that the predetermined number of revolutions mentioned above is a maximum number of engine revolutions that no inertial effect of intake air can be obtained even if the valve-close timing of the phase-variable valve is retarded after the valve-close timing of the phase-fixed valve, and can be obtained experimentally in advance.

Advantageous Effect of the Invention

According to the present invention, a high expansion ratio internal combustion engine can be realized by employing a variable valve train in which, among a plurality of intake valves arranged at each cylinder, some valve(s) is of variable phase and the remaining valve(s) is of fixed phase. As a result, it becomes possible to facilitate reduction in size and weight of the high expansion ratio internal combustion engine.

DESCRIPTION OF THE REFERENCE SIGNS

Figure 1:
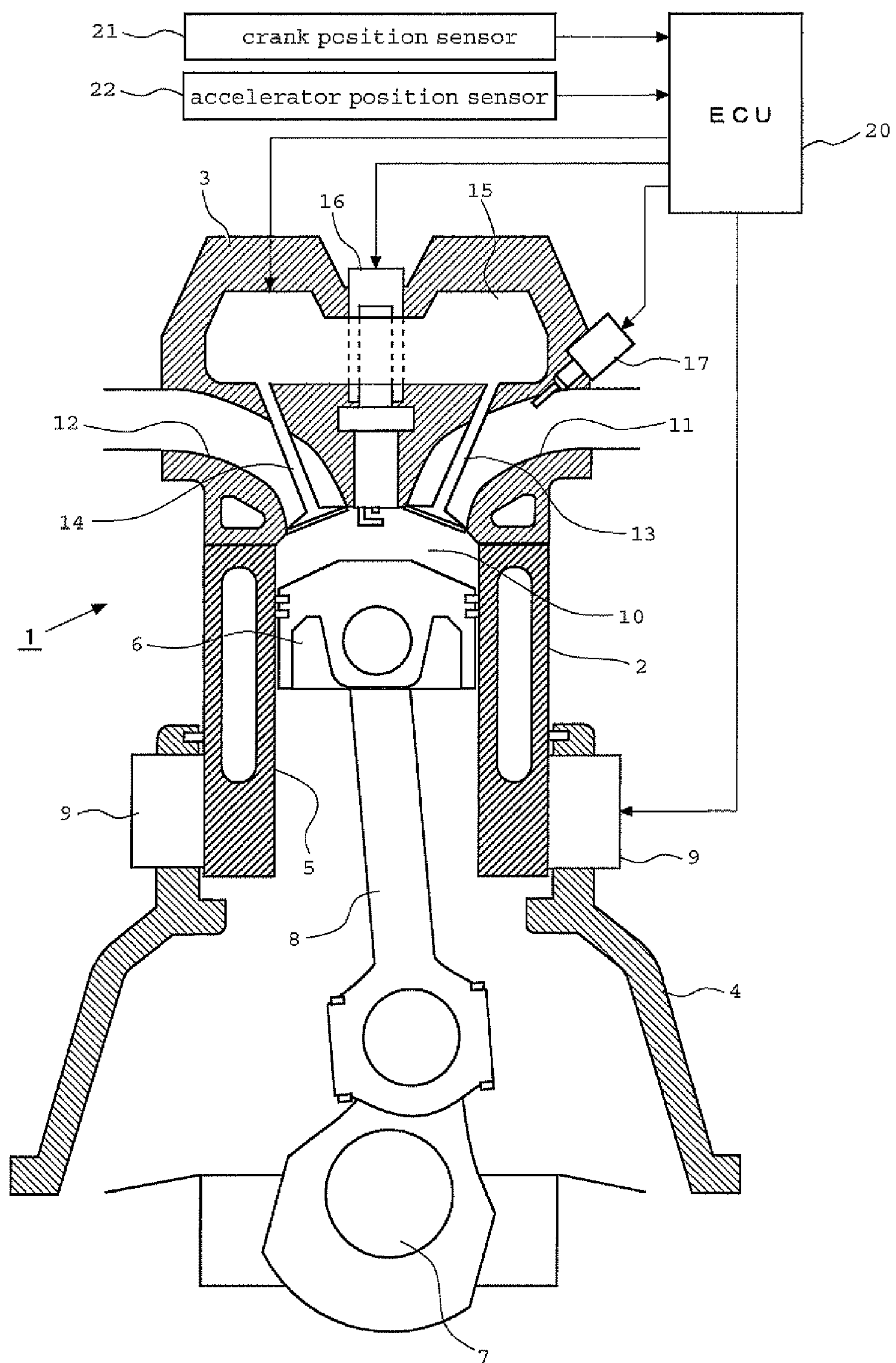
FIG. 1 is an illustration showing the schematic configuration of an internal combustion engine to which the present invention is applied.

1 internal combustion engine
2 cylinder block
3 cylinder head
4 crankcase
5 cylinder
6 piston
7 crankshaft
8 connecting rod
9 drive module
10 combustion chamber
11 intake port
12 exhaust port
13 intake valve
13*a* first intake valve
13*b* second intake valve
14 exhaust valve
15 valve train
16 ignition plug
17 fuel injection valve
150 intake camshaft
151 exhaust camshaft
152 phase variable mechanism
153 intake-side gear
154 exhaust-side gear
155 first intake cam
156 first rocker arm
157 exhaust cam
158 second intake cam
159 second rocker arm
160 rocker shaft

THE BEST MODE FOR EMBODYING THE INVENTION

Specific modes for embodying the present invention will now be described based on the drawings. None of dimension, material, shape, relative arrangement, etc. of any of components described in the embodiments is intended to limit the technical scope of the invention unless otherwise stated.

<Embodiment 1>

First of all, a first embodiment of the present invention will be described based on FIGS. 1 through 9. FIG. 1 is an illustration showing the schematic configuration of a high expansion ratio internal combustion engine according to the present invention.

An internal combustion engine 1 shown in FIG. 1 is a four-stroke cycle internal combustion engine that is equipped with a plurality of cylinders 5. The internal combustion engine 1 includes a cylinder block 2, a cylinder head 3, and a crankcase 4.

The cylinder block 2 has the plurality of cylinders 5 formed therein. A piston 6 is inserted in each cylinder 5 in a slidable manner. The piston 6 is coupled to a crankshaft 7 via a connecting rod 8, the crankshaft 7 being supported by the crankcase 4 in a rotatable manner.

The cylinder block 2 is supported against the crankcase 4 in a manner capable of advancing and retreating in the axial direction of cylinder. A drive module 9 that drives advancement and retreatment of the cylinder block 2 is attached to the crankcase 4. As the drive module 9 drives advancement and retreatment of the cylinder block 2, a volume of a combustion chamber 10 is varied and thus a mechanical compression ratio of the internal combustion engine 1 is varied therewith. With the drive module 9 thus driving advancement and retreatment of the cylinder block 2, a variable compression ratio mechanism according to the present invention can be realized.

Secondly, the cylinder head 3 has an intake port 11 and an exhaust port 12 formed therein. An intake valve 13 for opening and closing an opening end of the intake port 11 and an exhaust valve 14 for opening and closing an opening end of the exhaust port 12 are attached to the cylinder head 3. Each of the intake valve 13 and the exhaust valve 14 has its opening and closing driven by a valve train 15 which will be described later.

Also attached to the cylinder head 3 are an ignition plug 16 for ignition of air-fuel mixture within the combustion chamber 10 and a fuel injection valve 17 for injection of fuel into the intake port 11. The fuel injected from the fuel injection valve 17 flows into the combustion chamber 10 along with new air (air) when the intake valve 13 is opened, and is subjected to ignition and combustion by the ignition plug 16. The gas that has undergone combustion within the combustion chamber 10 (burned gas) is then exhausted to the exhaust port 12 when the exhaust valve 14 is opened.

Figure 2:
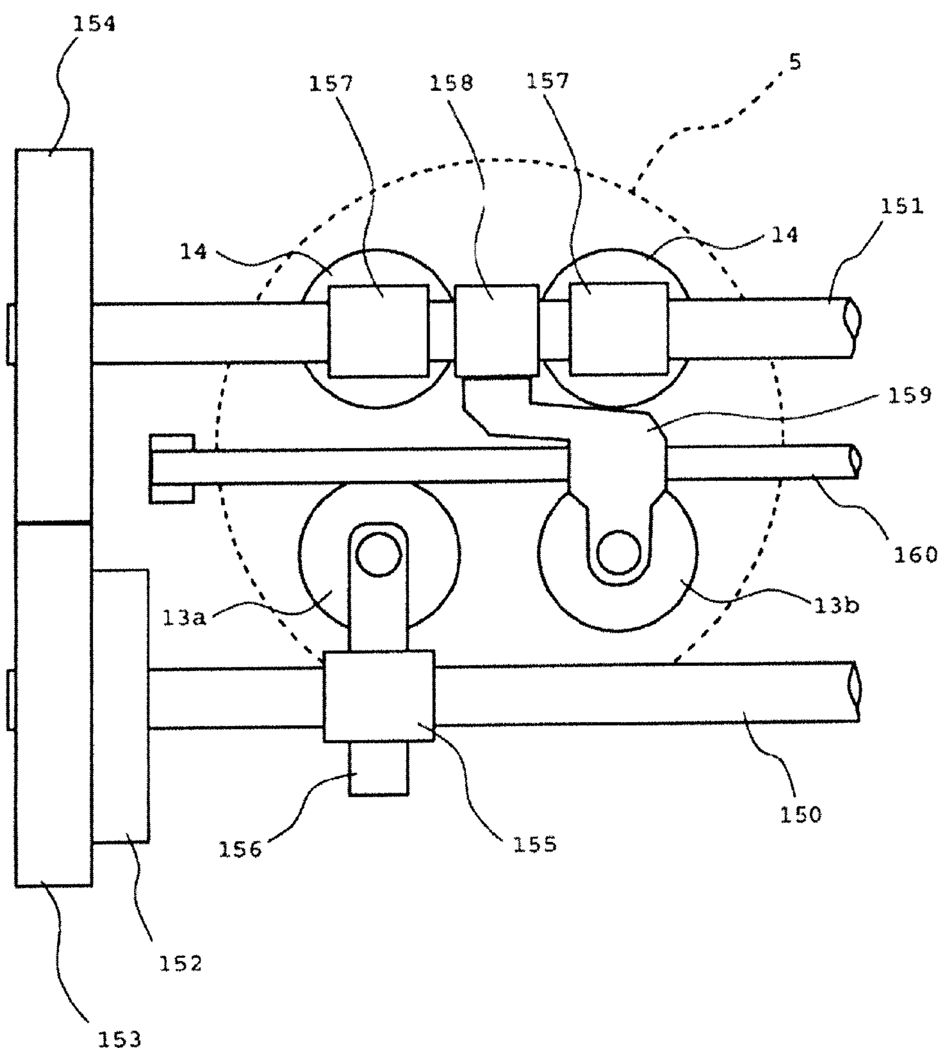
FIG. 2 is a plan view showing the configuration of a valve train.

FIG. 2 is an illustration showing the configuration of the valve train 15 described above. Although FIG. 2 illustrates a case where two intake valves 13 and two exhaust valves 14 are provided to each cylinder, this is not a restrictive case. For example, all that is required is that two or more intake valves 13 are provided to each cylinder. As for the exhaust valve 14, one valve may be provided to each cylinder, or two or more valves may be provided to each cylinder.

The valve train 15 includes an intake camshaft 150 and an exhaust camshaft 151. One end of the intake camshaft 150 is coupled to an intake-side gear 153 via a phase variable mechanism 152. One end of the exhaust camshaft 151 is coupled to an exhaust-side gear 154. The intake-side gear 153 and the exhaust-side gear 154 are in engagement with each other.

Since either one of the intake-side gear 153 and the exhaust-side gear 154 is coupled to the crankshaft 7 via a belt or chain, the intake-side gear 153 and the exhaust-side gear 154 can be rotated by rotational force of the crankshaft 7.

The above-mentioned phase variable mechanism 152 is a mechanism that varies a phase of the intake camshaft 150 with respect to the intake-side gear 153. Known phase variable mechanism of vane type, electrically operated type, and the like can be employed as the phase variable mechanism 152.

Figure 3:
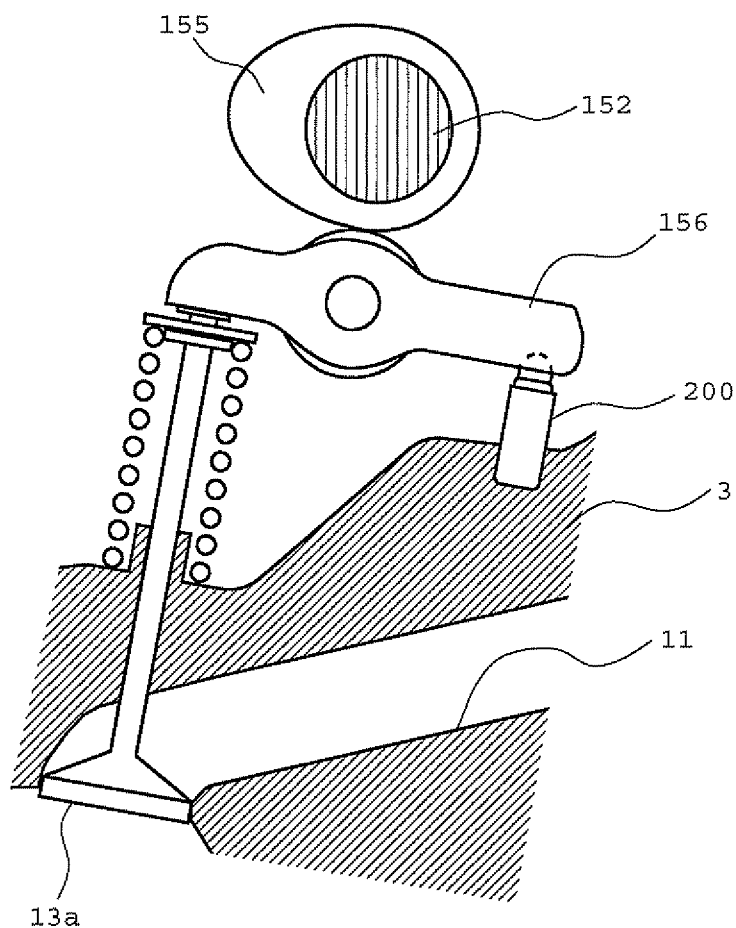
FIG. 3 is an illustration showing a mechanism of driving opening and closing of a first intake valve.

A first intake cam 155 for driving opening and closing of one of the two intake valves 13 (hereinafter referred to as "first intake valve 13*a*") is provided to the intake camshaft 150. The first intake cam 155 is in abutment with a first rocker arm 156. The first rocker arm 156 is supported by a pivot 200 in a swingable manner, as shown in FIG. 3. Furthermore, a distal end portion of the first rocker arm 156 is in abutment with a stem proximal end of the first intake valve 13*a*. With such a configuration, the first intake valve 13*a* is opened as the first intake cam 155 presses down the first rocker arm 156.

Returning to FIG. 2, the exhaust camshaft 151 has a pair of exhaust cams 157 formed thereon. Each of the exhaust cams 157 is arranged to press on a stem proximal end of the exhaust valve 14. Furthermore, a second intake cam 158 for driving opening and closing of the other one of the two intake valves 13 (hereinafter referred to as "second intake valve 13*b*") is also provided between the pair of exhaust cams 157 on the exhaust cam shaft 151.

Figure 4:
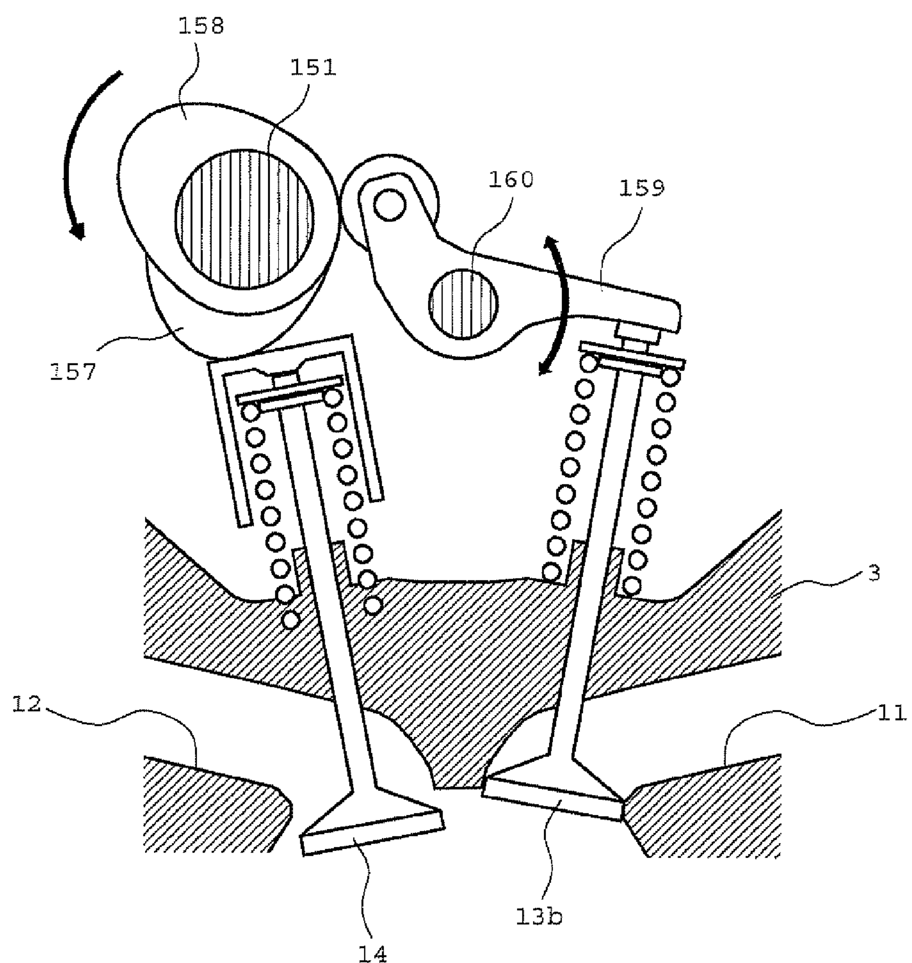
FIG. 4 is an illustration showing a mechanism of driving opening and closing of a second intake valve and an exhaust valve.

The second intake cam 158 is in abutment with a second rocker arm 159. The second rocker arm 159 is supported by a rocker shaft 160 in a rotatable manner, as shown in FIG. 4. A proximal end of the second rocker arm 159 is in abutment with the second intake cam 158 described previously, and a distal end of the second rocker arm 159 is in abutment with a stem proximal end of the second intake valve 13*b*. With such a configuration, the second intake valve 13*b* is opened as the second intake cam 158 presses on the second rocker arm 159.

The valve train 15 thus configured is a mechanism that drives opening and closing of one of the two intake valves 13*a*, 13*b* (first intake valve 13*a*) by means of the intake camshaft 150 and drives opening and closing of the other one of the valves (second intake valve 13*b*) by means of the exhaust camshaft 151. That is, the valve train 15 corresponds to a variable valve train by which timings for opening and closing the first intake valve 13*a* are variable and timings for opening and closing the second intake valve 13*b* are invariable.

With the valve train 15 described above, a valve included angle (an angle between the stem line of the intake valve 13 and the stem line of the exhaust valve 14) can be made smaller so that reduction in size and weight of the internal combustion engine 1 can be facilitated.

Returning to FIG. 1, an ECU 20 as a control means involved in the present invention is also provided along with the internal combustion engine 1. The ECU 20 is an electronic control unit that is constructed of CPU, ROM, RAM, backup RAM, and the like. The ECU 20 is arranged to receive inputs of output signals from various sensors such as a crank position sensor 21, an accelerator position sensor 22, and the like. The ECU 20 electrically controls the drive module 9, the ignition plug 16, the fuel injection valve 17, the valve train 15 (phase variable mechanism 152), and the like based on the output signals from the various sensors mentioned above.

For example, the ECU 20 executes a high expansion ratio control so as to enhance thermal efficiency of the internal combustion engine 1 when the engine is under low-load operating state. In the high expansion control, the ECU 20 controls the drive module 9 to increase the mechanical compression ratio of the internal combustion engine 1, and also controls the phase variable mechanism 152 to decrease an effective compression ratio of the internal combustion engine 1.

In detail, the ECU 20 controls the drive module 9 such that the cylinder block 2 is displaced toward a bottom dead center, and also controls the phase variable mechanism 152 such that a valve-close timing of the first intake valve 13*a* is retarded until the middle of the compression stroke.

By executing such a high compression ratio control, the expansion ratio can be increased while maintaining the effective compression ratio within a range that knocking can be avoided. According to the present embodiment, therefore, it becomes possible to operate the internal combustion engine 1 with high expansion ratio while facilitating reduction in size and weight of the internal combustion engine 1.

Since the combustion chamber volume is reduced to the extent possible in the execution of the high expansion ratio control, setting the valve-open timing of the second intake valve 13*b* similarly as in typical internal combustion engines (for example, to be angularly advanced than a compression top dead center) results in valve stamp. It is therefore necessary to set the valve-open timing of the second intake valve 13*b* to be retarded after that in typical internal combustion engines (for example, to be after the compression top dead center).

If the internal combustion engine 1 is operated with high-load under the restrictions described above, the timing of new air (air)'s flowing into the cylinder will be lagged behind. Therefore, there is no hope for increase in air intake quantity thanks to inertial effect of exhaustion, and this may result in shortage of air intake quantity.

On the other hand, one possible way to increase the air intake quantity is to advance the valve-open timing of the first intake valve 13*a*. In doing so, if the working angle of the first intake valve 13*a* is equivalent to the working angle of the second intake valve 13*b*, then the valve-close timing of the first intake valve 13*a* will be advanced angularly than that of the second intake valve 13*b*. Therefore, there is a possibility that the air intake quantity of the internal combustion engine 1 cannot be increased to a targeted level.

Figure 5:
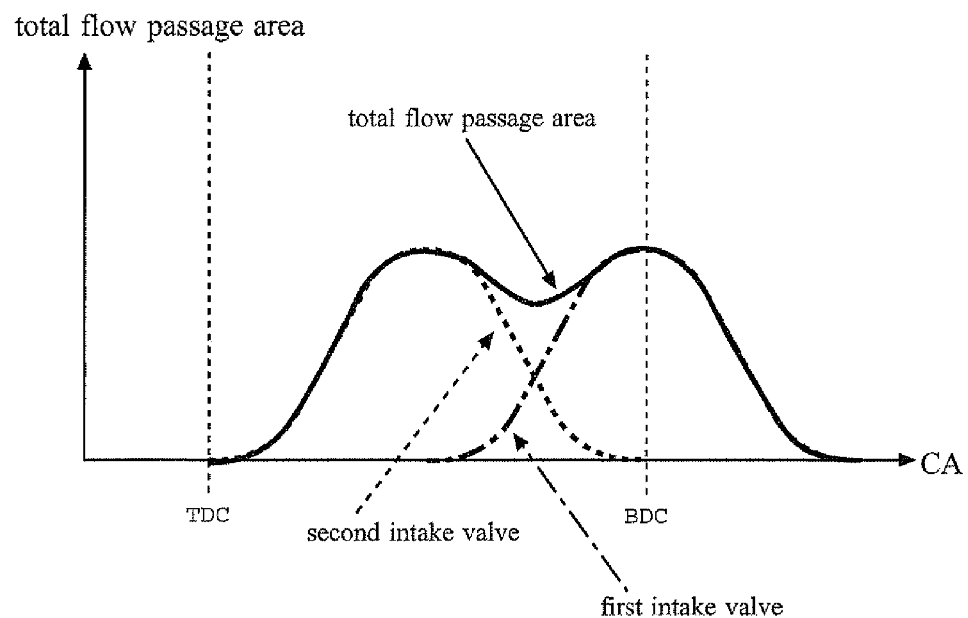
FIG. 5 is an illustration showing a total flow passage area when a working angle of the first intake valve and a working angle of the second intake valve are equivalent.

Further, in low-load operation of the internal combustion engine 1 (during execution of the high expansion ratio control), the valve-close timing of the first intake valve 13*a* is retarded until the middle of the compression stroke so as to decrease the effective compression ratio. In doing so, if the working angle of the first intake valve 13*a* is equivalent to the working angle of the second intake valve 13*b*, then an amount of overlap between the valve-opening period of the first intake valve 13*a* and the valve-opening period of the second intake valve 13*b* will be decreased. Therefore, a total flow passage area (a sum of valve-opened flow passage area of the first intake valve 13*a* and valve-opened flow passage area of the second intake valve 13*b*) will be reduced in the vicinity of the valve-close timing of the second intake valve 13*b*, as shown in FIG. 5. As a result, throttle loss of intake air may also be increased. Note that in FIG. 5, a solid line indicates the total flow passage area; a dashed-dotted line indicates the flow passage area of the first intake valve 13*a;* and a short dashed line indicates the flow passage area of the second intake valve 13*b*.

In light of the foregoing, the high expansion ratio internal combustion engine of the present embodiment is configured such that the working angle of the first intake valve 13*a* is larger than the working angle of the second intake valve 13*b*. In doing so, it is preferable that the working angle of the first intake valve 13*a* is determined to satisfy the following two requirements.

Figure 6:
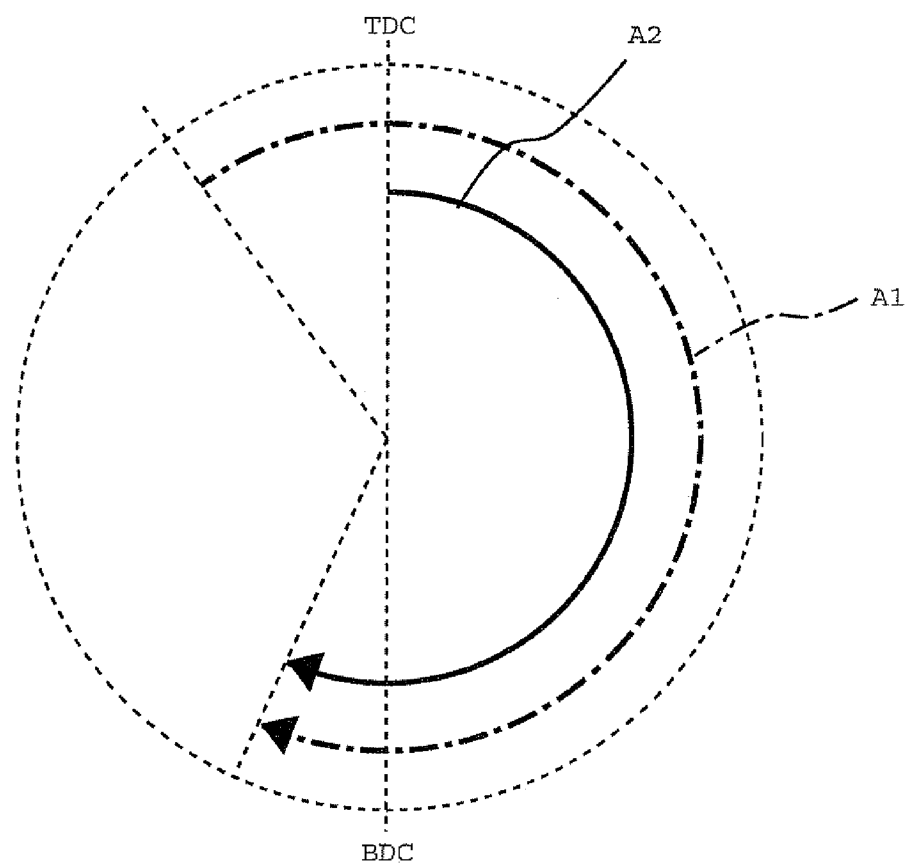
FIG. 6 is an illustration showing a preferable working angle of the first intake valve in high-load operation.

(1) If the valve-open timing of the first intake valve 13*a* is set to a targeted valve-close timing of high-load operation, then the valve-close timing of first intake valve 13*a* will be after the valve-close timing of the second intake valve 13*b*, as shown in FIG. 6. Note that in FIG. 6, a line A1 (dashed-dotted line) indicates the working angle of the first intake valve 13*a;* and a line A2 (solid line) indicates the working angle of the second intake valve 13*b*.

Figure 7:
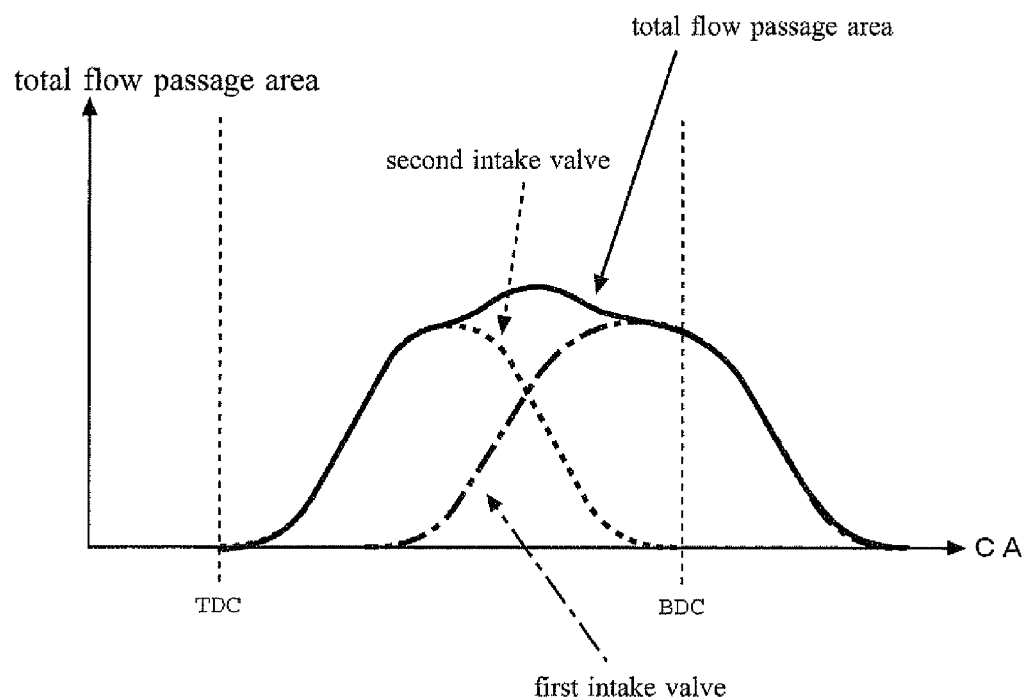
FIG. 7 is an illustration showing a preferable working angle of the first intake valve in low-load operation.
Figure 8:
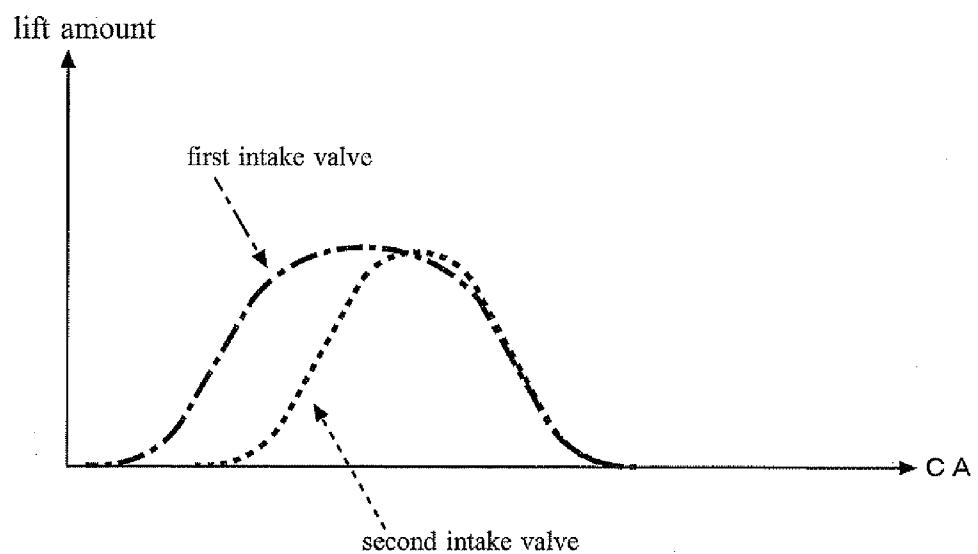
FIG. 8 is an illustration showing an open/close timing of the first intake valve in high-load, low revolution operation.
Figure 9:
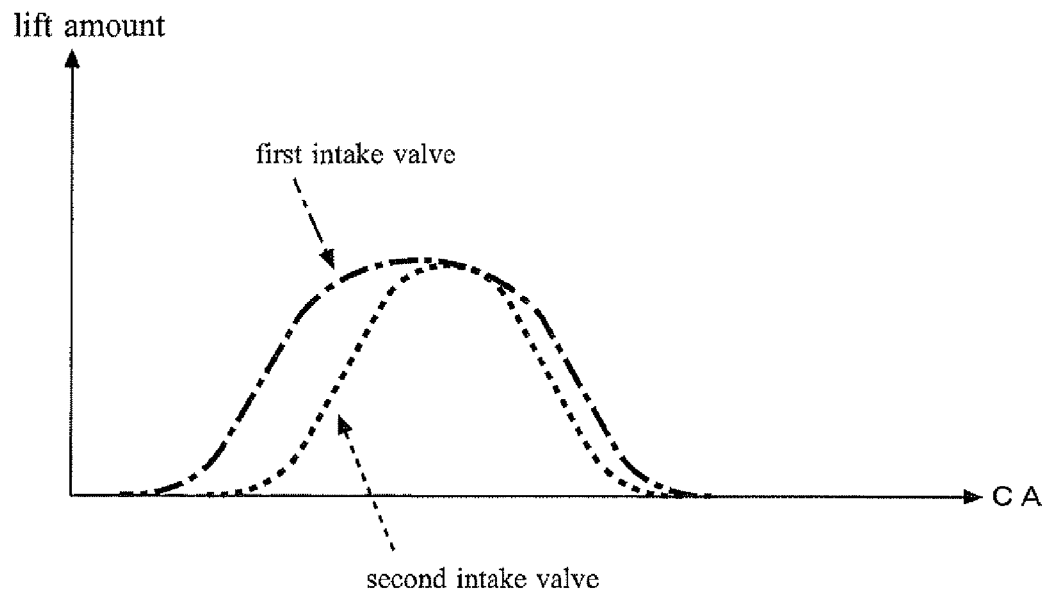
FIG. 9 is an illustration showing an open/close timing of the first intake valve in high-load, high revolution operation.

(2) If the valve-close timing of the first intake valve 13*a* is set to a targeted valve-close timing of low-load operation (of during execution of the high expansion ratio control), then the total flow passage area will not decrease but will increase in the vicinity of the valve-close timing of the second intake valve 13*b*, as shown in FIG. 7. Note that in FIG. 7, a solid line indicates the total flow passage area; a dashed-dotted line indicates the flow passage area of the first intake valve 13*a;* and a short dashed line indicates the flow passage area of the second intake valve 13*b*.

Once the working angle of the first intake valve 13*a* is determined to satisfy the above conditions (1) and (2), the ECU 20 can set the valve-open timing of the first intake valve 13*a* to be advanced than that of the second intake valve 13*b* and at the same time set the valve-close timing of the first intake valve 13*a* to be after the valve-close timing of the second intake valve 13*b*, in high-load operation of the internal combustion engine 1. As a result, it becomes easier to increase the air intake quantity during high-load operation to a targeted value.

Also, the ECU 20 can cause the valve-close timing of the first intake valve 13*a* to be retarded until the middle of the compression stroke while reducing the decrease in amount of overlap between the valve-opening period of the first intake valve 13*a* and the valve-opening period of the second intake valve 13*b*, in low-load operation of the internal combustion engine 1. As a result, it is possible to decrease the effective compression ratio while at the same time reducing throttle loss (including throttle loss associated with air flowing from the intake port 11 into the cylinder 5 and throttle loss associated with air flowing back from within the cylinder 5 to the intake port 11).

Note that the ECU 20 may alternatively be configured to adjust the valve-close timing of the first intake valve 13*a* according to a number of engine revolutions, in high-load operation of the time the internal combustion engine 1. For example, the ECU 20 may control the phase variable mechanism 152 such that the valve-close timing of the first intake valve 13*a* is synchronous with the valve-close timing of the second intake valve 13*b* if the number of engine revolutions is less than or equal to a predetermined number of revolutions (see FIG. 8), and control the phase variable mechanism 152 such that the valve-close timing of the first intake valve 13*a* is retarded after that of the second intake valve 13*b* if the number of engine revolutions is greater than the predetermined number of revolutions (see FIG. 9).

The inertial force of intake air is larger when the number of engine revolutions is high. Thus, when the number of engine revolutions is high, causing the valve-close timing of the second intake valve 13*b* to be retarded results in increase in quantity of intake air to be charged in the cylinder 5. On the other hand, the inertial force of intake air is smaller when the number of engine revolutions is low. Thus, when the number of engine revolutions is low, causing the valve-close timing of the second intake valve 13*b* to be retarded will cause the intake air charged in the cylinder 5 to flow back into the intake port 11.

Therefore, by adjusting the valve-close timing of the first intake valve 13*a* in high-load operation of the internal combustion engine 1 according to the number of engine revolutions, efficiency of intake air charge can be enhanced to the maximum extent possible. Note that the predetermined number of revolutions mentioned above is a maximum number of engine revolutions that no inertial effect of intake air can be obtained even if the valve-close timing of the first intake valve 13*a* is retarded after the valve-close timing of the second intake valve 13*b*, and is obtained experimentally in advance.

Therefore, according to the high expansion ratio internal combustion engine of the present embodiment, it becomes possible to facilitate reduction in size and weight of the internal combustion engine while maintaining approximately equivalent performance as high expansion ratio internal combustion engines in which every intake valve is of variable phase.

<Embodiment 2>

Figure 10:
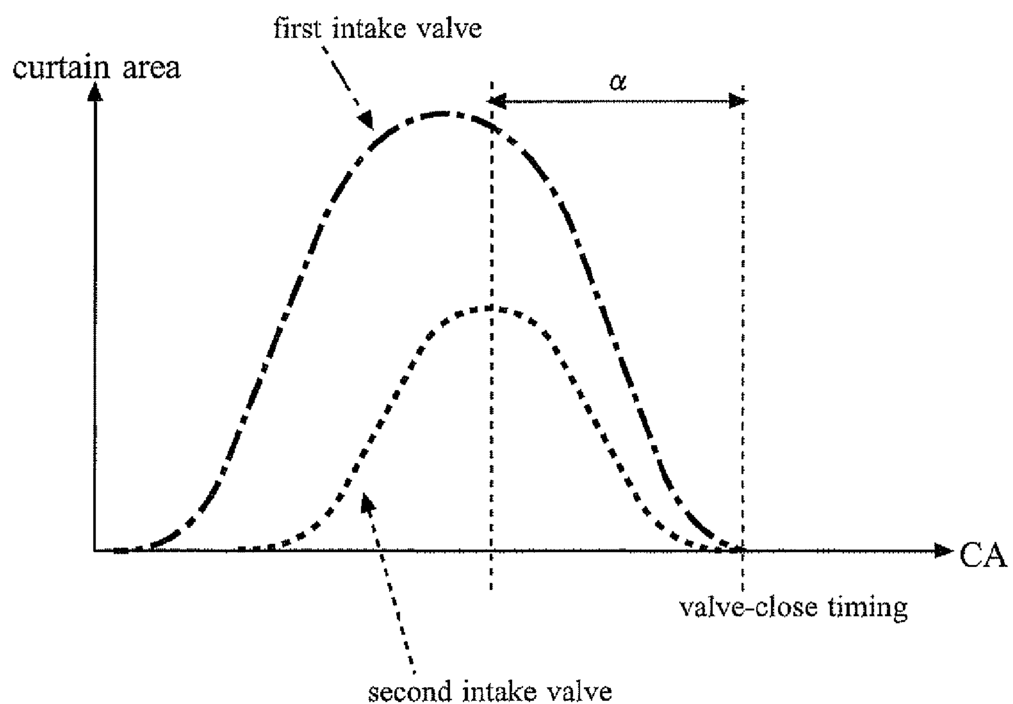
FIG. 10 is an illustration showing a curtain area of a first intake valve 13 and a curtain area of a second intake valve in a second embodiment.

Next, a second embodiment of the present invention will be described based on FIG. 10. Here, only those components different from the above-described first embodiment will be described and those identical will not be described.

In the first embodiment described above, an example that makes the working angle of the first intake valve 13*a* larger than the working angle of the second intake valve 13*b* has been discussed. However, in the present embodiment, another example will be discussed that makes a curtain area of the first intake valve 13*a* larger than a curtain area of the second intake valve 13*b* at the same time as making the working angle of the first intake valve 13*a* larger than the working angle of the second intake valve 13*b*.

In low-load operation of the internal combustion engine 1 (during execution of the high expansion ratio control), the valve-close timing of the first intake valve 13*a* retarded after the valve-close timing of the second intake valve 13*b*. Therefore, after the second intake valve 13*b* is closed, all of intake air flowing from the intake port 11 into the cylinder 5 and all of intake air flowing back from within the cylinder 5 to the intake port 11 will travel only through the first intake valve 13*a*.

As a result, there is a problem that throttle loss is likely to increase after the second intake valve 13*b* is closed. Especially in case where the valve-close timing of the first intake valve 13*a* is retarded until the middle of the compression stroke, there arises a problem that throttle loss shows a pronounced increase just before the first intake valve 13*a* is closed. This is because a traveling speed of the piston 6 and correspondingly a flow speed of the intake air become highest at the middle of the compression stroke.

In light of the foregoing, the high expansion ratio internal combustion engine of the present embodiment is configured such that a curtain area of the first intake valve 13*a* is larger than a curtain area of the second intake valve 13*b*. The term "curtain area" used herein refers to an area of curtain in a range from the valve-close timing to a predetermined crank angle $\alpha$ before the valve-close timing, as shown in FIG. 10, for example. An example of the predetermined crank angle $\alpha$ in such case is a crank angle that the lift amount of the second intake valve 13*b* requires to vary from its maximum lift amount to zero.

Once the curtain area of the first intake valve 13*a* is set as just described, an amount of decrease in curtain area per unit time (per unit crank angle), in other words, a rate of decrease in curtain area, of the first intake valve 13*a* is larger than that of the second intake valve 13*b*, during valve-closing operations of the intake valves. This results in the curtain area of the first intake valve 13*a* being decreased drastically just before the first intake valve 13*a* is closed. Consequently, throttle loss becomes less likely to increase than in the case where the curtain area decreases gradually similarly to the second intake valve 13*b*.

Next, ways to make the curtain area of the first intake valve 13*a* larger than the curtain area of the second intake valve 13*b* will be described.

Figure 11:
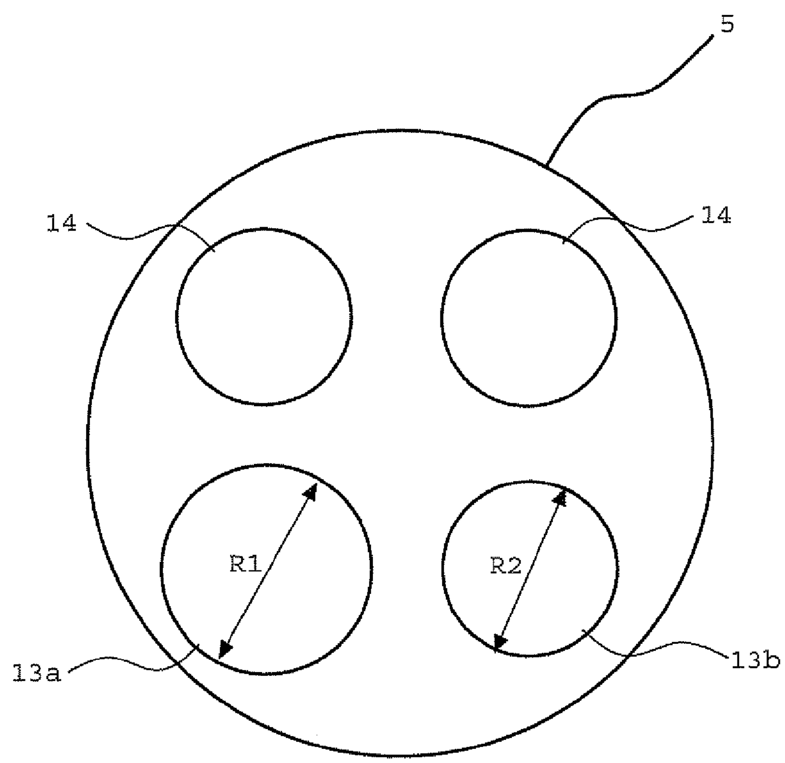
FIG. 11 is an illustration showing a first way to make the curtain area of the first intake valve larger than the curtain area of the second intake valve.

One example way to make the curtain area of the first intake valve 13*a* larger than the curtain area of the second intake valve 13*b* is to make a valve diameter R1 of the first intake valve 13*a* larger than a valve diameter R2 of the second intake valve 13*b* (R1>R2), as shown in FIG. 11.

Figure 12:
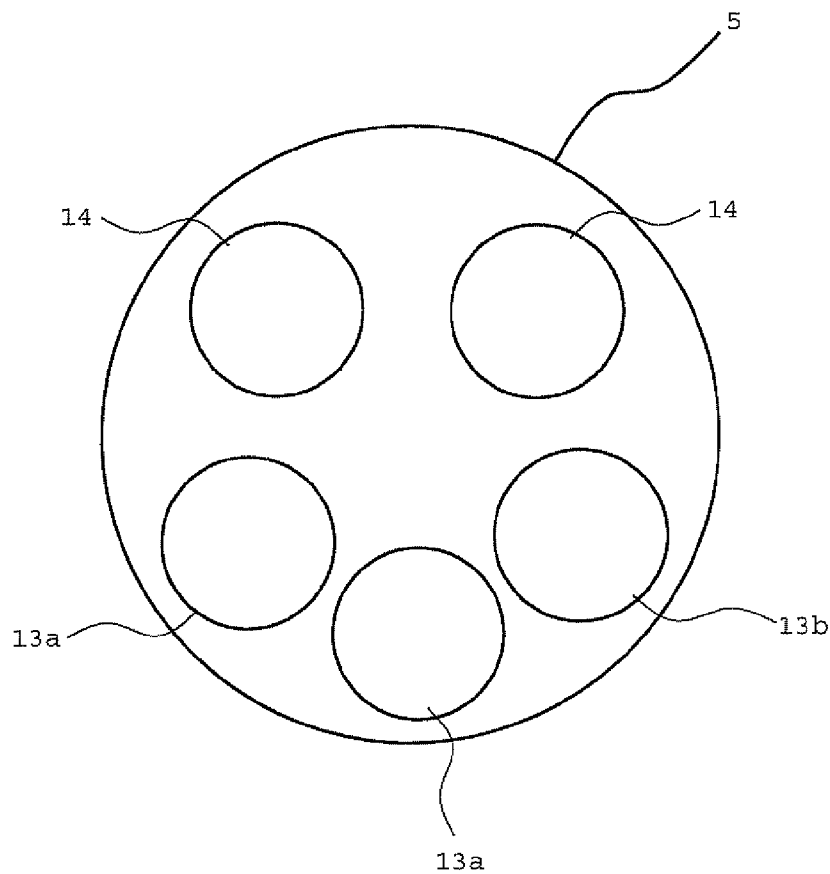
FIG. 12 is an illustration showing a second way to make the curtain area of the first intake valve larger than the curtain area of the second intake valve.

Another example way to make the curtain area of the first intake valve 13*a* larger than the curtain area of the second intake valve 13*b* is to arrange a larger number of the first intake valves 13*a* than the second intake valve(s) 13*b* at each cylinder, as shown in FIG. 12.

Figure 13:
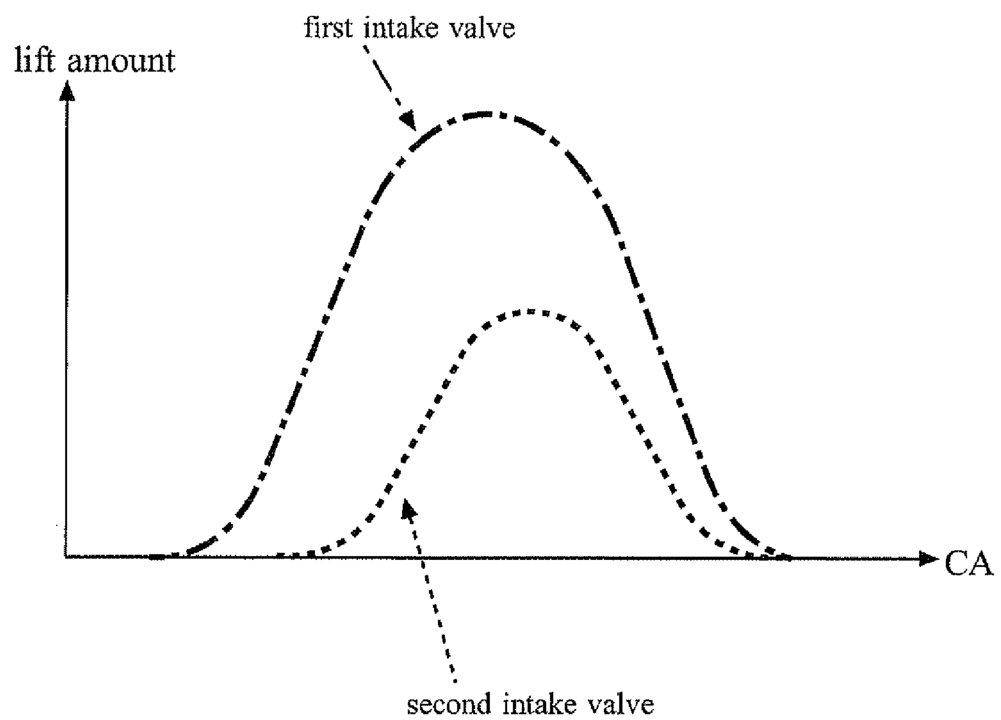
FIG. 13 is an illustration showing a third way to make the curtain area of the first intake valve larger than the curtain area of the second intake valve.

Another example way to make the curtain area of the first intake valve 13*a* larger than the curtain area of the second intake valve 13*b* is to determine a cam profile of the first intake cam 155 such that a maximum lift amount of the first intake valve 13*a* is larger than a maximum lift amount of the second intake valve 13*b*, as shown in FIG. 13.

Figure 14:
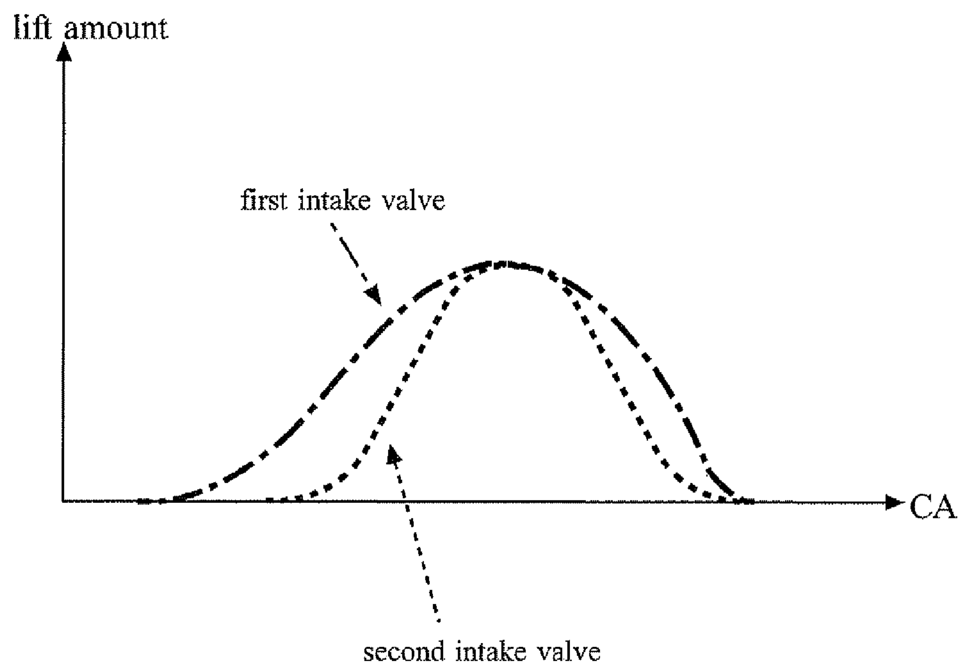
FIG. 14 is an illustration showing a fourth way to make the curtain area of the first intake valve larger than the curtain area of the second intake valve.

Another example way to make the curtain area of the first intake valve 13*a* larger than the curtain area of the second intake valve 13*b* is to determine a cam profile of the first intake cam 155 such that a lift waveform of the first intake valve 13*a* makes a convex waveform, as shown in FIG. 14. In doing so, the cam profile may also be determined such that a rate of change of lift of the first intake valve 13*a* during valve-closing operation (a decrement in the lift amount per unit crank angle) is greater than a rate of change of lift of the first intake valve 13*a* during valve-opening operation (an increment in the lift amount per unit crank angle). In other words, the cam profile of the first intake cam 155 may also be determined such that the lift waveform of the first intake valve 13*a* during valve-opening operation and the lift waveform of the first intake valve 13*a* during valve-closing operation are asymmetric.

Figure 15:
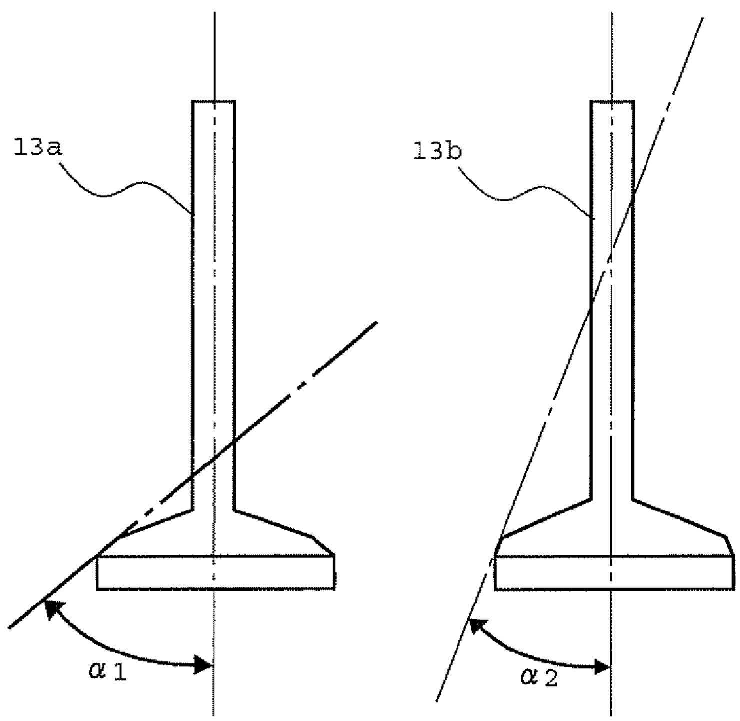
FIG. 15 is an illustration showing a fifth way to make the curtain area of the first intake valve larger than the curtain area of the second intake valve.

Another example way to make the curtain area of the first intake valve 13*a* larger than the curtain area of the second intake valve 13*b* is to make a face angle (an angle between the face surface of the valve and the stem line of the valve) $\alpha 1$ of the first intake valve 13*a* larger than a face angle $\alpha 2$ of the second intake valve 13*b*, as shown in FIG. 15.

The ways described above can be combined to the extent possible. In such case, the curtain area of the first intake valve 13*a* as well as the rate of decrease in curtain area during valve-closing operation of the first intake valve 13*a* can be further increased. As a result, it becomes possible to decrease throttle loss and flow loss after the second intake valve 13*b* is closed to the extent possible during execution of the high expansion ratio control.

The invention claimed is:

1. A high expansion ratio internal combustion engine comprising:
- a variable compression ratio mechanism for changing a mechanical compression ratio of the internal combustion engine;
- a variable valve train in which some valve(s) of a plurality of intake valves arranged at a cylinder is phase-variable and the remaining valve(s) is phase-fixed; and
- a control unit for controlling the variable compression ratio mechanism such that the mechanical compression ratio of the internal combustion engine is increased and also controlling the variable valve train such that valve-close timing of the phase-variable intake valve is retarded after valve-close timing of the phase-fixed intake valve, when the internal combustion engine is under low-load operating state,
- wherein the variable valve train is configured such that a working angle of the phase-variable intake valve is larger than a working angle of the phase-fixed intake valve.

2. A high expansion ratio internal combustion engine according to claim 1, wherein:
- the control unit controls the variable compression ratio mechanism such that the mechanical compression ratio of the internal combustion engine is decreased and also controls the variable valve train such that a valve-open timing of the phase-variable intake valve is advanced before a valve-open timing of the phase-fixed intake valve, when the internal combustion engine is under high-load operating state.

3. A high expansion ratio internal combustion engine according to claim 2, wherein:
- the working angle of the phase-variable intake valve is set such that a valve-close timing of the phase-variable intake valve is after a valve-close timing of the phase-fixed intake valve in case where the valve-open timing of the phase-variable intake valve is advanced to a targeted valve-open timing on high-load operating state of the internal combustion engine.

4. A high expansion ratio internal combustion engine according to claim 3, wherein:
- the control unit controls the variable valve train such that the valve-close timing of the phase-variable intake valve is synchronized with the valve-close timing of the phase-fixed intake valve when the internal combustion engine is under high-load operating state and a number of engine revolutions is less than or equal to a predetermined number of revolutions, and such that the valve-close timing of the phase-variable intake valve retarded after the valve-close timing of the phase-fixed intake valve when the internal combustion engine is under high-load operating state and the number of engine revolutions is greater than the predetermined number of revolutions.

5. A high expansion ratio internal combustion engine according to claim 1, wherein:
- the variable valve train is configured such that a curtain area of the phase-variable intake valve is larger than a curtain area of the phase-fixed intake valve.

6. A high expansion ratio internal combustion engine according to claim 5, wherein:
- the variable valve train is configured such that a valve diameter of the phase-variable intake valve is larger than a valve diameter of the phase-fixed intake valve.

7. A high expansion ratio internal combustion engine according to claim 5, wherein:
- the variable valve train is configured such that a larger number of the phase-variable intake valves are provided than the phase-fixed intake valve(s).

8. A high expansion ratio internal combustion engine according to claim 1, wherein:
- the variable valve train is configured such that a rate of decrease in curtain area of the phase-variable intake valve during valve-closing operation is larger than a rate of decrease in curtain area of the phase-fixed intake valve during valve-closing operation.

9. A high expansion ratio internal combustion engine according to claim 8, wherein:
- the variable valve train is configured such that a lift amount of the phase-variable intake valve is larger than a lift amount of the phase-fixed intake valve.

10. A high expansion ratio internal combustion engine according to claim 8, wherein:
- the variable valve train is configured such that a speed of valve-closing operation of the phase-variable intake valve is larger than a speed of valve-closing operation of the phase-fixed intake valve.

* * * * *